United States Patent [19]

Allen, Jr., deceased et al.

[11] 4,216,244

[45] Aug. 5, 1980

[54] LOW SODIUM SALT SEASONING

[76] Inventors: Alfred E. Allen, Jr., deceased, late of Bothell, Wash.; John W. Day, executor, Mercer Island, King County, Wash. 98040

[21] Appl. No.: 943,758

[22] Filed: Sep. 19, 1978

Related U.S. Application Data

[63] Continuation-in-part of Ser. No. 796,529, May 13, 1977, abandoned, which is a continuation of Ser. No. 698,048, Jun. 21, 1976, abandoned.

[51] Int. Cl.² ............................................. A23L 1/237
[52] U.S. Cl. ................................... 426/649; 426/650; 426/804
[58] Field of Search ................ 426/649, 650, 658, 804

[56] References Cited

U.S. PATENT DOCUMENTS

| | | | |
|---|---|---|---|
| 2,845,354 | 7/1958 | Ogawa et al. | 426/649 X |
| 2,968,566 | 1/1961 | Munch | 426/649 |
| 3,306,753 | 2/1967 | Norsen | 426/649 |
| 3,505,082 | 4/1970 | Miller | 426/649 |
| 3,860,732 | 1/1975 | Eisenstadt | 426/649 |

*Primary Examiner*—Esther M. Kepplinger
*Attorney, Agent, or Firm*—Seed, Berry, Vernon & Baynham

[57] ABSTRACT

A low sodium seasoning including potassium chloride as its major ingredient together with other non-sodium compounds masking the bitterness of the potassium chloride so that the seasoning can be substituted for sodium chloride seasonings.

1 Claim, No Drawings

LOW SODIUM SALT SEASONING

PRIOR APPLICATIONS

This application is a continuation-in-part of copending application Ser. No. 796,529 filed May 13, 1977, now abandoned, which was a continuation of Ser. No. 698,048, filed June 21, 1976, now abandoned.

BACKGROUND OF THE INVENTION

The present invention relates to a substitute for the standard sodium chloride table salt to eliminate substantially all of the sodium so that the sodium ratio will be less than 10 milligrams per 100 grams of material which is normally medically considered to be a sodium-free dietetic seasoning suitable for patients required to be on low sodium diets.

Sodium chloride salt is a frequently used ingredient in nearly all prepared foods and is frequently added to foods at the table. Furthermore, sodium is found naturally in the foods we eat, even those picked from the home garden. Sodium in various forms is used as a preservative, and is found in such items as toothpaste, mouth wash and drugs. For such items as hams, bacon, and pickles, salt is an essential ingredient. The average sodium intake is between 2 and 7 grams per day from all sources, including that added at the table or in cooking.

It has long been recognized by medical authorities that sodium tends to cause fluid retention in the body of some patients to an objectionable extent and is harmful to patients with congestive heart disease, hypertension or high blood pressure.

For these and other medical reasons, many persons find it necessary to restrict their sodium intake to well below their accustomed intakes; restrictions vary from 500 milligrams to 3 grams per day. As a practical matter such restrictions require the omission of canned and frozen vegetables, canned or dried soups, canned and frozen meat, fish and poultry, smoked or pickled meat and fish, all items preserved by brining, all packaged cake, cookies, bread and cereal mixes, and all snack items such as crackers, chips, dips, and salted nuts. Hence, for those on very low sodium diets, it is commonly necessary that all foods be prepared at home, without the addition of salt, baking powder, and baking soda. Such diets can be quite restrictive, are usually bland in flavor, and represent a major change in food buying and food preparation habits.

In the treatment of high blood pressure it is common to use diuretics to reduce the fluid content of the body, but this results in such a reduction of the potassium in the body that the patient treated with the diuretic must also take a potassium supplement. Hence, high blood pressure patients, except those also suffering from renal failure, have a need for both a low sodium and a high potassium diet.

In the past, efforts have been made to provide a low sodium seasoning salt by the substitution of potassium chloride for sodium chloride. Past commercial efforts to produce a low sodium seasoning salt have involved various combinations of flavoring, flavor enhancers and buffers with the potassium chloride together with suitable free-flow agents such as silicon dioxide and magnesium silicate. For example, one combination has simply been potassium chloride, tricalcium phosphate as a buffer and magnesium silicate. Another approach has been the combination with the potassium chloride of monopotassium glutamate, tartaric acid and silicon dioxide. Other formulations have involved the use of glutamic acid than the glutamate together with suitable buffers. The potassium chloride has also been supplemented by other salt substitutes such as ammonium chloride and calcium chloride.

The resulting commercial products have produced flavors which are objectionably bitter to many people whether used in cooking or sprinkled on their ready-to-eat comestibles. Some produced a particularly bitter flavor if added during cooking of the food, and hence could only be used after cooking. The products have also been so concentrated that they could not be used commercially in food recipes in the same weight amount as specified for ordinary table salt, or in the home in the same volume amount as specified for table salt.

SUMMARY OF THE INVENTION

In view of the foregoing, the present invention aims to provide a seasoning salt which meets the needs of patients on a low sodium diet and assists those on a high potassium diet, and also is not bitter to the taste when either used directly on ready-to-eat comestibles or on food being prepared.

Another object is to provide a low sodium seasoning salt which can be used in food recipes as a direct substitute for the specified amount of ordinary table salt therein.

The above objectives are achieved by providing a seasoning salt formulation having potassium chloride as its major ingredient and containing small amounts of buffers and flavor enhancers, together with a suitable anit-caking agent, so as to mask the bitterness of the postassium chloride and provide a pleasant salty flavor. The buffering and flavor enhancing is accomplished by the use of potassium citrate, potassium phosphate, L-glutamic acid and monopotassium glutamate. As part of the present invention there is provided a low sodium salt base which can be diluted about 10% by the use of the lactose or other suitable diluent to give a product which can be used on a 1:1 basis by volume as a substitute for ordinary salt. This base consists by weight of a mixture of about 92% potassium chloride, about 3% L-glutamic acid, about 1% each of monopotassium glutamate, potassium citrate and potassium phosphate, and about 1% of an anti-caking agent.

Continuing to more specific examples of seasonings embodying the present invention, the following Formula (1) provides a plain low sodium salt base suitable for dilution by a non-sodium diluent to serve as a substitute for ordinary table salt (sodium chloride).

| % by weight | Ingredient |
| --- | --- |
| 92.4 | Potassium chloride |
| 3.0 | L-Glutamic acid |
| 1.3 | Potassium citrate |
| 1.3 | Potassium phosphate |
| 1.0 | Monopotassium glutamate |
| 1.0 | Silicon dioxide |

In Formula (1) the potassium citrate gives a slight acidity tending to offset the bitterness of the potassium chloride. The potassium phosphate acts as a buffer as soon as the seasoning is subjected to water, and assists the silicon dioxide in preventing caking of the product. The glutamic acid and mono potassium glutamate enhance the flavor and are important in masking the bitterness of the potassium chloride. It will be appreciated that a trace (0.01%) of potassium iodide may be included to provide an iodized low sodium salt, if desired, to the same extent as prescribed for ordinary iodized table salt.

Formula (1) may be diluted about 10% by the use of suitable dry powdered diluents to achieve a product which can be substituted on a 1:1 basis by volume with ordinary table salt to achieve the same salty taste. Lactose is a preferred diluent, but Sorbitol or other suitable mild sweeteners can be used as the diluent. Also, various seasoning flours such as sesame seed meal can be used.

The following Formula (2) for 1:1 substitution by volume for ordinary table salt, constitutes 9.5% lactose and 90.5% of Formula (1).

| % by weight | Ingredients |
|---|---|
| 83.6 | Potassium chloride |
| 9.5 | Lactose |
| 2.7 | L-Glutamic acid |
| 1.2 | Potassium citrate |
| 1.2 | Potassium phosphate |
| 0.9 | Monopotassium glutamate |
| 0.9 | Silicon dioxide |

Formula (1) can be used directly or modified as in Formula (2), or mixed as a salt substitute with other seasonings such as spices, herbs and vegetable powders to make more sophisticated seasonings in the same general manner as is currently done with sodium chloride salt.

What is claimed is:

1. A low sodium salt seasoning consisting by weight of a mixture of about 90% low sodium salt base and about 10% low sodium diluent, said base consisting by weight of a mixture of about 92% potassium chloride, about 3% L-glutamic acid, about 1% each of monopotassium glutamate, potassium citrate and potassium phosphate, and about 1% of an anti-caking agent.

* * * * *